US009690859B2

(12) United States Patent
Feng et al.

(10) Patent No.: US 9,690,859 B2
(45) Date of Patent: Jun. 27, 2017

(54) TRANSMITTING INFORMATION BASED ON READING SPEED

(71) Applicant: Alibaba Group Holding Limited, George Town (KY)

(72) Inventors: Zhaolin Feng, Hangzhou (CN); Zhongsheng Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 404 days.

(21) Appl. No.: 14/276,319

(22) Filed: May 13, 2014

(65) Prior Publication Data

US 2014/0344338 A1   Nov. 20, 2014

(30) Foreign Application Priority Data

May 16, 2013 (CN) .......................... 2013 1 0181926

(51) Int. Cl.

| G06F 15/16 | (2006.01) |
|---|---|
| G06F 15/173 | (2006.01) |
| G06F 17/21 | (2006.01) |
| G06F 17/30 | (2006.01) |
| H04L 29/08 | (2006.01) |

(52) U.S. Cl.
CPC ........ *G06F 17/30867* (2013.01); *H04L 67/06* (2013.01); *H04L 67/32* (2013.01); *H04L 67/22* (2013.01); *H04L 67/306* (2013.01)

(58) Field of Classification Search
CPC ............... H04L 29/08072; H04L 29/06; H04L 29/0809; H04L 29/06047; H04L 43/00; H04L 12/2602; H04L 41/22; G06Q 30/02; G06F 17/24; G06F 17/3089; G06F 12/2247; G06F 17/211; G06F 17/30882

USPC ......................................................... 709/203
See application file for complete search history.

(56) References Cited

U.S. PATENT DOCUMENTS

| 4,001,561 A | 1/1977 | Quaintance |
| 8,271,865 B1 | 9/2012 | Bennett |
| 8,612,584 B2 * | 12/2013 | Ashear .................... G06F 13/00 |
| | | 709/203 |

(Continued)

FOREIGN PATENT DOCUMENTS

| EP | 1455279 | 9/2004 |
| JP | 2002157267 | 5/2002 |

(Continued)

*Primary Examiner* — Mahran Abu Roumi
(74) *Attorney, Agent, or Firm* — Van Pelt, Yi & James LLP

(57) ABSTRACT

Transmitting information based on reading speed is disclosed, including: receiving an information acquisition request from a client device, wherein the information acquisition request includes a user identifier; determining the user identifier included in the information acquisition request; determining one or more historical information sent times and one or more historical sent information quantities corresponding to the user identifier from stored historical records; determining a reading speed corresponding to the user identifier based at least in part on the one or more historical information sent times and the one or more historical sent information quantities corresponding to the user identifier; determining a quantity of requested information to be sent to the client device based at least in part on the reading speed corresponding to the user identifier; and sending the quantity of requested information to the client device.

16 Claims, 9 Drawing Sheets

(56) References Cited

U.S. PATENT DOCUMENTS

| | | | |
|---|---|---|---|
| 8,874,731 B1* | 10/2014 | Puppin | G06F 17/30702 707/736 |
| 2001/0007980 A1 | 7/2001 | Ishibashi et al. | |
| 2004/0172630 A1 | 9/2004 | Seki et al. | |
| 2006/0078858 A1 | 4/2006 | Vroman et al. | |
| 2006/0248470 A1* | 11/2006 | Lee | H04N 5/44543 715/784 |
| 2011/0195388 A1* | 8/2011 | Henshall | G09B 5/062 434/317 |
| 2011/0314095 A1* | 12/2011 | Gupta | H04N 21/23412 709/203 |
| 2012/0084373 A1* | 4/2012 | Chen | H04L 67/10 709/206 |
| 2013/0007609 A1 | 1/2013 | Bak et al. | |
| 2013/0054786 A1 | 2/2013 | Ashear | |
| 2013/0297599 A1* | 11/2013 | Henshall | G11B 27/105 707/736 |
| 2015/0193554 A1* | 7/2015 | Yang | G06F 17/30867 715/205 |

FOREIGN PATENT DOCUMENTS

| | | |
|---|---|---|
| JP | 2004110413 | 4/2004 |
| JP | 2006004409 | 1/2006 |
| JP | 2012027763 | 2/2012 |
| WO | 9913414 | 3/1999 |

* cited by examiner

TRANSMITTING INFORMATION BASED ON READING SPEED

CROSS REFERENCE TO OTHER APPLICATIONS

This application claims priority to People's Republic of China Patent Application No. 201310181926.0 entitled A METHOD AND DEVICE FOR TRANSMITTING INFORMATION, filed May 16, 2013 which is incorporated herein by reference for all purposes.

FIELD OF THE INVENTION

The present application relates to the field of computer technology. In particular, it relates to techniques for transmitting information.

BACKGROUND OF THE INVENTION

At present, with the unceasing development of wireless networks and mobile terminals, users can acquire the information they need from servers at any time and in any place.

Currently, a common technique for transmitting information from a server to a client device is the following: when a client device receives an information acquisition command from a user or a computer program, it sends an information acquisition request to a server. The server determines the information that the client device requested and sends a fixed quantity of the information that the client device requested back to the client device. When the client device receives another information acquisition command (e.g., a next-page command), it sends another information acquisition request to the server and the server sends another fixed quantity of the information that the client device requested back to the client device.

For example, assume that the fixed quantity is ten pieces of information and that the service end determines that the client device requested 100 pieces of information. In this example scenario, the service end sends the first ten pieces of these 100 pieces of information back to the client device for display. FIG. 1 shows an example of a display at a client device. The display shows the seven pieces of the first ten pieces of requested information that were returned by the service end. Each piece of information is associated with the label "Row" and a corresponding number from "4" through "10." After browsing these ten pieces of information, a user using the client device may wish to browse subsequent information. The user may then select the "Load More" button shown in the example of FIG. 1 to submit a next-page command. In another example, the user may submit a next-page command by sliding the screen up to the last piece of information ("Row 10" as shown in FIG. 1).

After the client device receives the next-page command, it sends an information acquisition request to the server. In response, the server sends back the 11th to 20th pieces of information from the aforementioned 100 pieces of information to the client device for display.

However, in an actual application, each reader's reading speed will differ. As such, sending a fixed quantity of information to each user may fail to satisfy each user's individual needs. In addition, in the case of users who read more quickly, such users will finish browsing the fixed quantity of information sent back by the server quickly each time and will request to browse another fixed quantity of information. If, during a peak time period for information browsing, there are relatively many fast-reading users requesting additional information with their client devices, the server will be inundated with requests. A great volume of requests may lead to degradation on the server.

BRIEF DESCRIPTION OF THE DRAWINGS

Various embodiments of the invention are disclosed in the following detailed description and the accompanying drawings.

DETAILED DESCRIPTION

Figure 1:
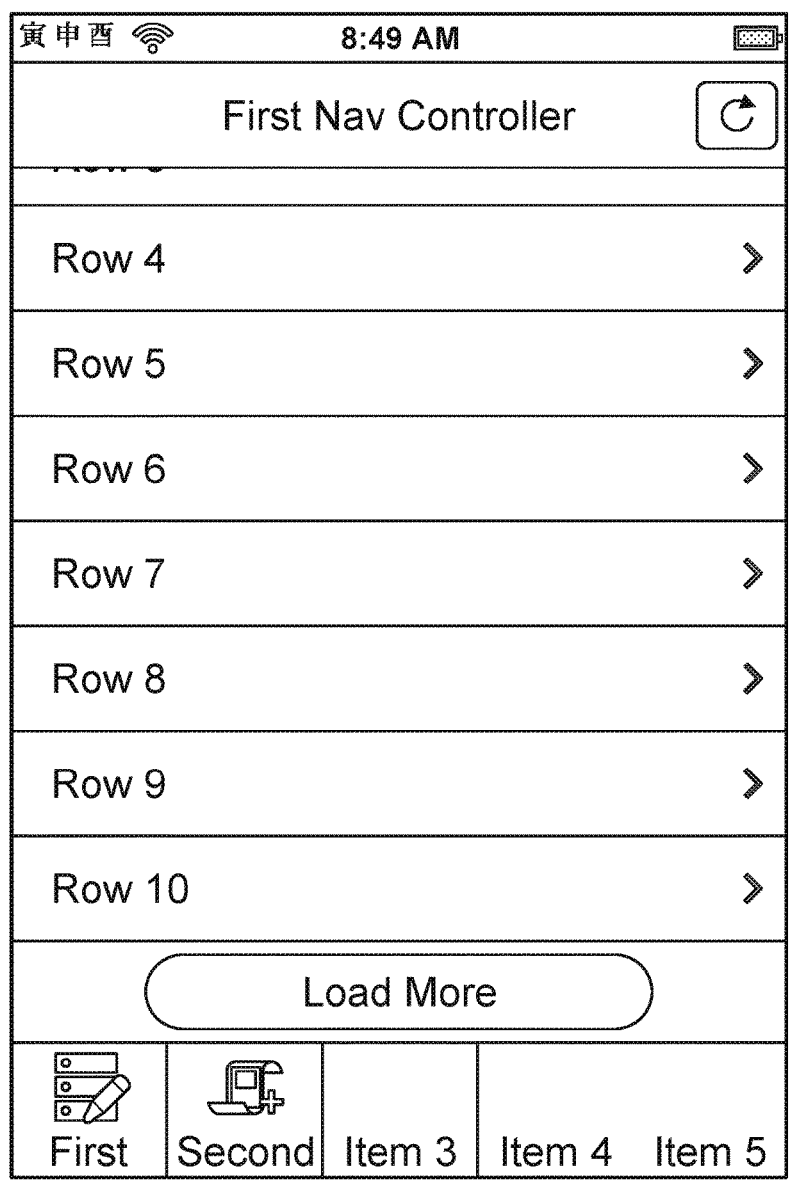
FIG. 1 shows an example of a display at a client device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of transmitting information based on reading speed are described herein. In some embodiments, an information acquisition request is received from a client device. In some embodiments, a user identifier included in the information acquisition request is determined. In some embodiments, one or more historical information sent times and one or more historical sent information quantities corresponding to the user identifier are determined from stored historical records. A reading speed corresponding to the user identifier is determined based at least in part on the one or more historical information sent times and the one or more historical sent information quantities corresponding to the user identifier. A quantity of requested information to be sent to the client device is determined based at least in part on the reading speed corresponding to the user identifier. For example, the faster the reading speed is, the greater the quantity of requested information determined. The quantity of the requested information is sent to the client device.

Figure 2:
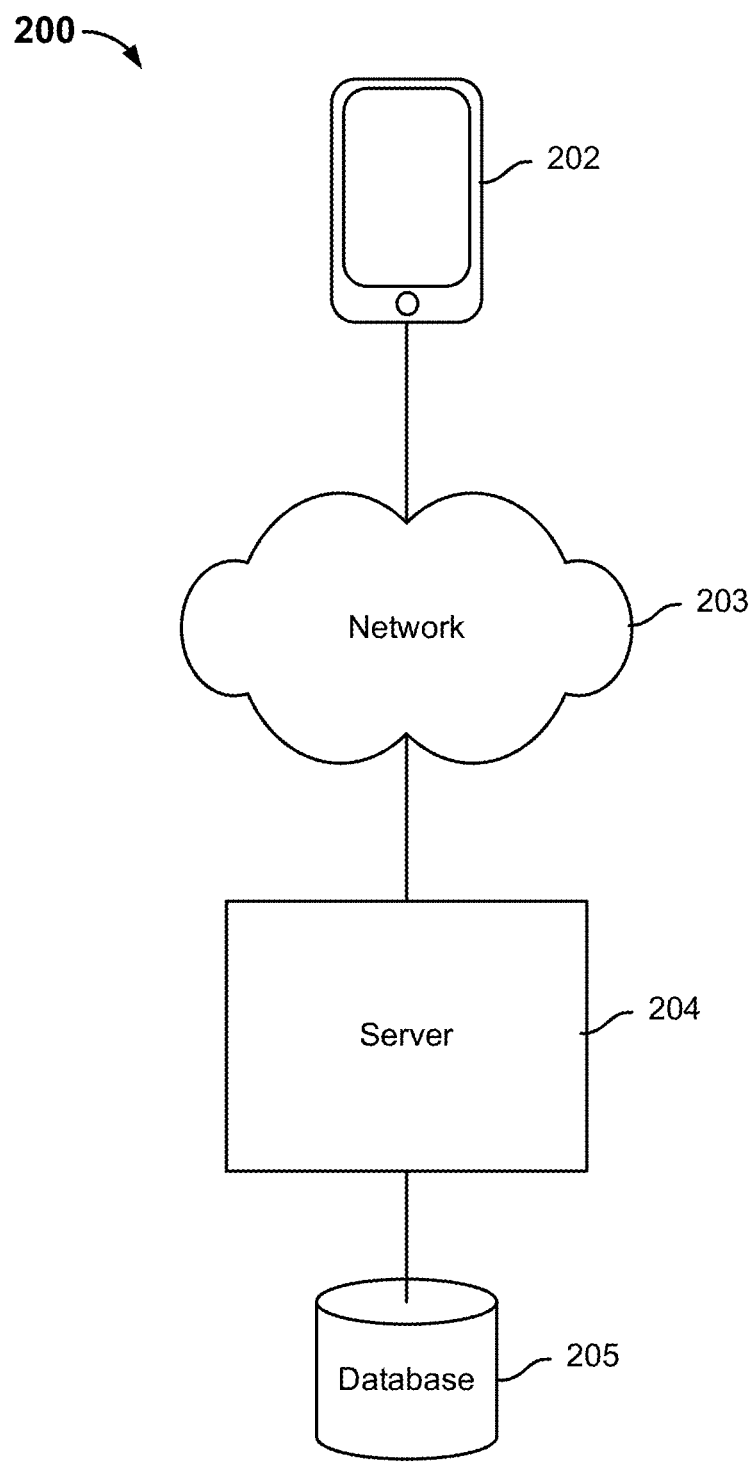
FIG. 2 is a diagram showing an embodiment of a system for transmitting information from a server to a client device.

FIG. 2 is a diagram showing an embodiment of a system for transmitting information from a server to a client device. In the example, system 200 includes client device 202, network 203, server 204, and database 205. Network 203 includes high-speed data networks and/or telecommunications networks. Database 205 can be implemented by one or more databases. While client device 202 is shown as a smart phone in the diagram, other examples of client device 202 include a laptop computer, a desktop computer, a tablet device, a mobile device and/or any other type of computing device.

Server 204 is configured to implement a service that transmits a quantity of requested information to a client device, such as client device 202, in response to an information acquisition request received from the client device. Example types of information that can be acquired from the service include forums, news, reviews, microblogs, blogs, and message boards. In various embodiments, server 204 is configured to determine the quantity of requested information to send to client device 202 based at least in part on a reading speed corresponding to a user identifier associated with the request. In some embodiments, the reading speed corresponding to the user identifier is determined based at least in part on historical data stored at database 205. Database 205 is accessible by server 204. For example, database 205 is configured to store historical times at which server 204 sent information (i.e., historical information sent times) requested by a user identifier corresponding to a user who used client device 202 and the corresponding quantities of requested information that were sent at those times (i.e., historical sent information quantities).

Client device 202 is configured to send information acquisition requests to the service implemented by server 204. In some embodiments, client device 202 is configured to execute a software application providing access to the server. In some embodiments, client device 202 is configured to send an information acquisition request to the server in response to receiving an information acquisition command (e.g., via a user selection at the application). For example, in the event that the information acquisition request sent to the server does not include a quantity of requested information, server 204 is configured to determine this quantity, as described above.

In some embodiments, client device 202, itself, is configured to determine a quantity of requested information to be requested from server 204 and to include this quantity into an information acquisition request to send to server 204. In some embodiments, client device 202 is configured to store historical data such as historical times at which client device 202 received information (i.e., historical information receipt times) requested by a user identifier corresponding to a user who used client device 202 and the corresponding quantities of requested information that were received at those times (i.e., historical received information quantities). In some embodiments, client device 202 is configured to determine the quantity of requested information to acquire from server 204 based at least in part on a reading speed corresponding to a user identifier corresponding to a user who used client device 202. In some embodiments, the reading speed corresponding to the user identifier is determined based at least in part on the historical data stored by client device 202. In some embodiments, client device 202 is configured to send an information acquisition request including the quantity of requested information determined by client device 202 to server 204. In response to receiving the information acquisition request including the quantity of requested information determined by client device 202, server 204 is configured to send the quantity of requested information back to client device 202.

As will be described in further detail below, a system such as system 300 tailors the amount of requested information to send to a user per each request for information based at least in part on that user's reading speed so the user will not complete consuming the received information too quickly or waste system resources by receiving too excess an amount of information. The amount of requested information to send to the user can be determined by a server such as server 204 or the user's client device such as client device 202.

Figure 3:
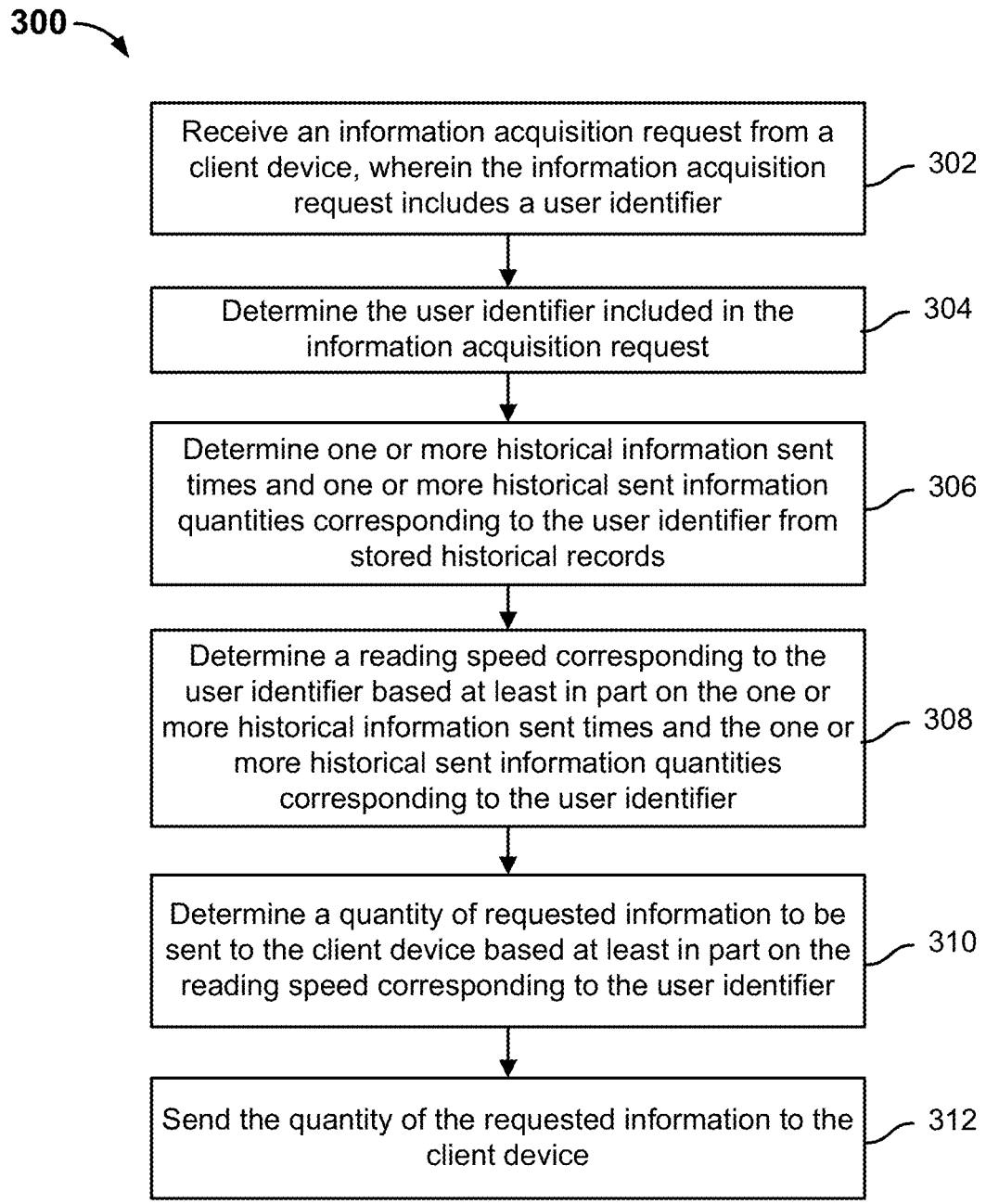
FIG. 3 is a flow diagram showing an embodiment of a process for transmitting information from a server to a client device.

FIG. 3 is a flow diagram showing an embodiment of a process for transmitting information from a server to a client device. In some embodiments, process 300 is implemented at system 200 of FIG. 2. Specifically, in some embodiments, process 300 is implemented at server 204 of system 200 of FIG. 2.

Process 300 may be performed each time that an information acquisition command is received (e.g., from a user or a computer program) at the client device. Process 300 can be implemented to determine a quantity of requested information to be transmitted to the client device.

At 302, an information acquisition request is received from a client device, wherein the information acquisition request includes a user identifier.

In various embodiments, when a user desires to acquire information from a server via a client device that he is using, the user can make an input or selection via an interface (e.g., keypad, touchscreen) of the client device to select an information acquisition command associated with the service implemented by the server. For example, a software application associated with the server can be executing at the client device. Example types of information that can be acquired from the server include forums, news, reviews, microblogs, blogs, and message boards. The requested information may include text and multimedia data such as images, audio, and/or video files. After the client device receives the information acquisition command from the user, the client device sends an information acquisition request to the server to acquire the corresponding information. The information acquisition request (e.g., an HTTP GET request) may include data identifying which information is requested. For example, the data identifying which information is requested can identify a particular portion of a particular page of a message board, such as a URL used to locate the particular portion of the particular page of the message board.

In various embodiments, the information acquisition request may also include the user identifier of the user who is currently logged into the client device and/or to the application associated with the service. The user identifier can include an alphanumeric string.

In response to the information acquisition request received from the client device, the server will send back several pieces of information from the requested information, which are then displayed at the client device. After the user finishes browsing these several pieces of information at the client device, he may select another information acquisition command (e.g., a next-page command) via the interface of the client device. After the client device receives the next-page command, the client device can send another information acquisition request to the server to acquire additional pieces of information from the requested information. This subsequent information acquisition request may also include data identifying which information is requested (e.g., the URL associated with a subsequent page of the message board) and the user identifier of the user who is currently logged into the client device and/or the application associated with the server.

At 304, the user identifier included in the information acquisition request is determined.

In some embodiments, as the server processes information acquisition requests corresponding to various user identifiers over time, the server implementing the service stores in historical records the times at which requested information was sent back to each requesting user identifier and the corresponding quantities of requested information that were sent back to each requesting user identifier. Specifically, for example, following each time that the server sends information to a client device in response to an information acquisition request, the server can store data corresponding to the user identifier included in that information acquisition request in the historical records. The stored data includes the time at which requested information (i.e., the information sent time) was transmitted to the client device from which the request was received and the quantity of the information that was sent at that information sent time (i.e., the sent information quantity).

At 306, one or more historical information sent times and one or more historical sent information quantities corresponding to the user identifier are determined from stored historical records.

After receiving the information acquisition request, the server can determine the user identifier included in the information acquisition request and look up in the stored historical records the historical information sent times and historical sent information quantities corresponding to that user identifier.

At 308, a reading speed corresponding to the user identifier is determined based at least in part on the one or more historical information sent times and the one or more historical sent information quantities.

The looked up historical information sent times and historical sent information quantities are used to determine the reading speed corresponding to the user identifier.

In some embodiments, the server determines the reading speed corresponding to the user identifier. In some embodiments, the server can identify the most recent information (e.g., from a current time as maintained by the server) sent time as T1 and the earliest information sent time as T2 among all the looked-up historical information sent times. Furthermore, the server can determine a time interval between the earliest information sent time, T2, and the most recent information sent time, T1, as the difference (T1−T2). The server can then determine the sum, m, of all looked-up historical sent information quantities. For example, the value of m may represent the total number of pieces or the total amount of information that have been transmitted for the user identifier. Finally, the server can determine the ratio of the sum of all sent information quantities, m, to the time interval between the earliest information sent time and the most recent information sent time, T1−T2, $$\frac{m}{T1-T2},$$

as the reading speed corresponding to the user identifier.

It may be considered that the user reading speed is highly time-sensitive. Therefore, in order to improve the accuracy of reading speed determination, in some embodiments, only the historical information sent times and historical sent information quantities within a most recent preset designated time length are used to determine the reading speed corresponding to the user identifier. The designated time length can be preset by a system administrator. For example, in some embodiments, the server can look up only the historical information sent times corresponding to the user identifier that fall within the most recent preset designated time length in the historical records and the sent information quantities corresponding to all the information sent times corresponding to the user identifier that fall within the most recent preset designated time length. As such, when the most recent preset designated time length is used, the reading speed corresponding to the user identifier can be determined as the ratio of the sum of the looked-up historical sent information quantities corresponding to all the information sent times falling within the most recent preset designated time length to the designated time length.

The following is an example of determining the reading speed corresponding to the user identifier using the most recent preset designated time length: Assume that the designated time length is 1 minute, in which case the server looks up the historical information sent times corresponding to the user identifier within the most recent 1 minute from the current time (e.g., as maintained by the server) in the historical records. Assume that the looked up information sent times within the most recent 1 minute are T1 and T2. The server then looks up the historical sent information quantities corresponding to the user identifier corresponding to T1 and T2, respectively. Suppose that the current time is 12:00:00 pm. The user had previously requested data from the server at 11:58:59 pm, 11:59:50 pm, and 11:59:55 pm. If the designated time length is 1 minute, then in this example, T1 is 11:59:50 pm and T2 is 11:59:55 pm. Assume that the looked-up historical sent information quantity corresponding to T1 is M1 and that the historical sent information quantity corresponding to T2 is M2. Thus, the server determines the sum of M1 and M2: M1+M2. Lastly, the server determines the ratio of M1+M2 to the designated time length, 1 minute, as the reading speed corresponding to the user identifier. Put another way, the determined reading speed corresponding to the user identifier in the example is M1+M2 pieces of information per minute.

In addition, if the server fails to find any historical information sent times corresponding to the user identifier within the most recent preset designated time length in the historical records (i.e., the server has not sent information to the user corresponding to the user identifier within the most recent preset designated time length), then the server will determine a preset default reading speed as the reading speed corresponding to the user identifier. The default reading speed can be preset by a system administrator.

At 310, a quantity of requested information to be sent to the client device is determined based at least in part on the reading speed corresponding to the user identifier.

In various embodiments, a quantity of requested information to be sent to the client device is determined based at least in part on the determined reading speed corresponding to the user identifier. In various embodiments, the greater the reading speed, the greater the quantity of requested information sent to the client device. The quantity of requested information may refer to a number of pieces or a number of units of the type of information identified by the information acquisition request to be sent to the client device in response to the information acquisition request. For example, a piece of information from a message board may comprise a message and a piece of information from a blog may comprise a blog post.

In some embodiments, a functional relationship, e.g., $N=F(v)$, may be preset for the server, where N is the quantity of requested information to be returned corresponding to a user identifier, v is the reading speed corresponding to the user identifier, and $F(v)$ is the functional relationship between the reading speed corresponding to the user identifier and the quantity of information that is to be returned corresponding to the user identifier. In various embodiments, $F(v)$ can be selected to be any (e.g., monotonically) increasing function such that the greater v is, the greater N will be. Conversely, the smaller v is, the smaller N will be. $F(v)$ can be selected to be a continuous function or a discrete function. For example, $N=F(v)=2v$.

At 312, the quantity of the requested information to be sent is transmitted to the client device. Once the appropriate quantity to be sent to the client device is determined, the determined appropriate quantity of the information requested in the information acquisition request is determined and transmitted to the client device. For example, if the determined quantity is 15 pieces of information and the requested information comprises messages within a particular page of a message board, then 15 messages from that page of the message board (e.g., that have not been previously transmitted to the client device) can be transmitted to and displayed by the client device.

In some embodiments, only information from the requested information that has not been previously sent to a client device is determined be sent to the client device in response to each subsequent information acquisition request received from the client device. For example, in response to a first information acquisition request corresponding to a user identifier received from a client device, if the appropriate quantity determined at step 310 is 12 pieces of information from a requested set of 200 pieces of information, pieces 1 through 12 of the requested information are transmitted to the client device. Then, in response to a second information acquisition request corresponding to that same user identifier received from that same client device, if the appropriate quantity determined at step 310 is now 14 pieces of information from the requested set of 200 pieces of information, pieces 13 through 27 of the requested information are transmitted to the client device.

Process 300, above, describes a server that does not send a fixed quantity of information back to each user, but rather sends a quantity of information to a user determined based at least in part on the user's reading speed. As such, process 300 can meet the individual needs of each user. Since the server sends the appropriate amount of requested information to a client device, each user would presumably cause information acquisition requests to be sent to the server less frequently. Therefore, the server can receive and process fewer information acquisition requests, which can reduce overall pressure on the server and network.

Figure 4:
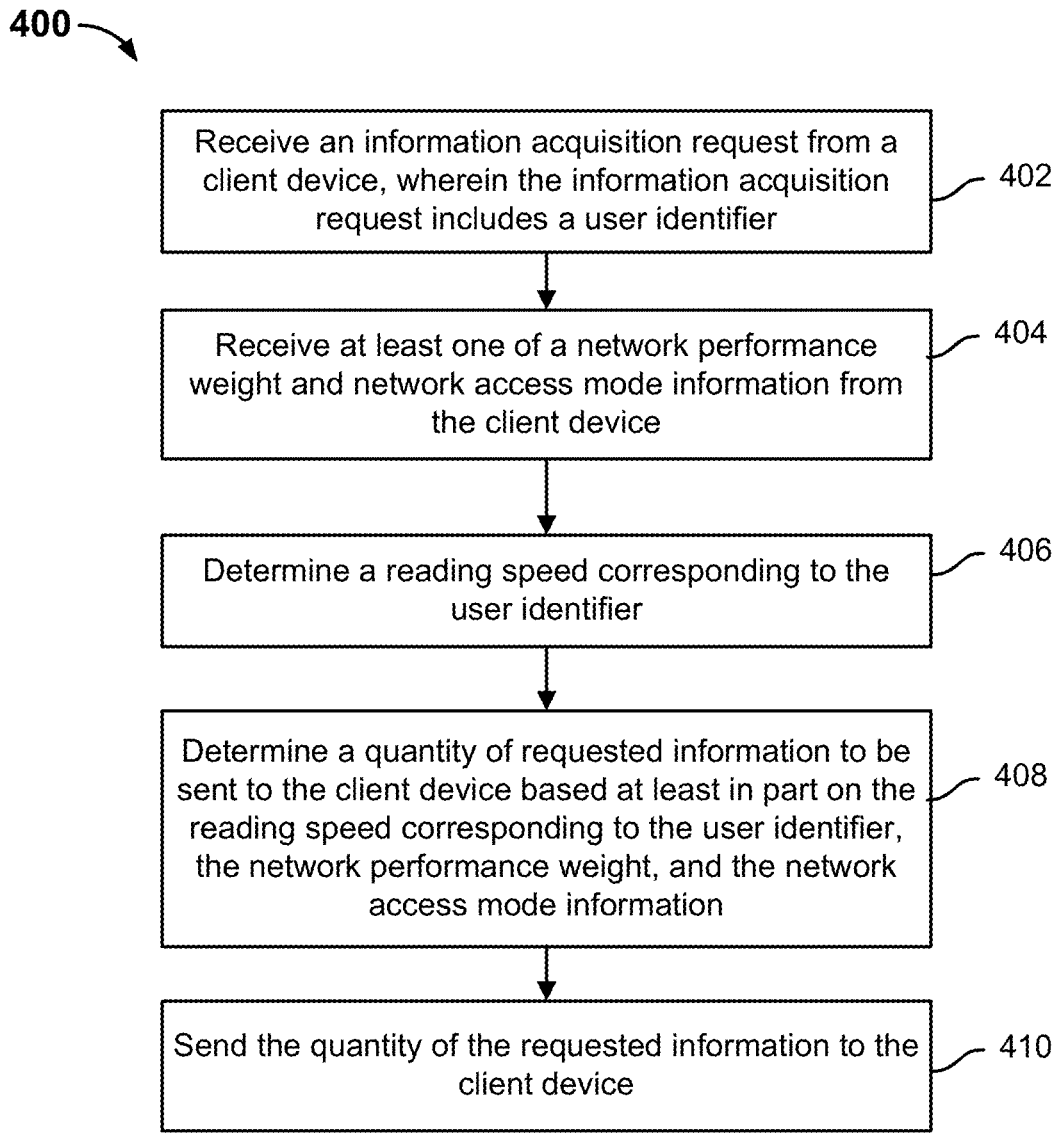
FIG. 4 is a flow diagram showing an embodiment of a process for transmitting information from a server to a client device.

FIG. 4 is a flow diagram showing an embodiment of a process for transmitting information from a server to a client device. In some embodiments, process 400 is implemented at system 200 of FIG. 2. Specifically, in some embodiments, process 400 is implemented at server 204 of system 200 of FIG. 2.

In some embodiments, in addition to the user's reading speed, factors associated with the network in which the client device is operating may also affect the quantity of requested information to send to the client device in response to an information acquisition request. Process 400 describes an example process of determining a quantity of requested information to send to the client device based on network factors associated with the client device in addition to the user's reading speed.

At 402, an information acquisition request is received from a client device, wherein the information acquisition request includes a user identifier. Step 402 can be implemented in a way similar to how step 302 of process 300 of FIG. 3 is implemented.

At 404, at least one of a network performance weight and network access mode information is received from the client device.

If the client device is in a relatively poor network environment or if the information transmission speed corresponding to the client device's network access mode is relatively slow, then the server may need to adjust the nature of the requested information that it plans to send to the client device. Therefore, in some embodiments, before the server determines the quantity of information to send to the client, the server also needs to receive the network performance weight, the network access mode information as reported by the client device, or both.

The network performance weight as reported by the client device represents the state of the network environment in which the client device is currently located. A larger network performance weight indicates a better network environment in which the client is currently located and, correspondingly, that a larger determined quantity of requested information should be transmitted to the client device. Conversely, a smaller network performance weight indicates a poorer network environment in which the client is currently located and, correspondingly, that a smaller determined quantity of requested information should be transmitted to the client device.

In some embodiments, the client device can determine the network performance weight to send to the server. The following is an example technique by which a client device can determine a network performance weight: the client device records a sent time corresponding to each time that the client device sends an information acquisition request to the server and a receipt time corresponding to the time at which the corresponding requested information was received from the server. When the client device determines the network performance weight, the client device determines the most recently recorded sent time as t1 and the corresponding receipt time as t2. The client device determines the time interval between the sent and receipt times by subtracting the sent time as t1 from the receive time t2. Moreover, the client device makes use of a preset unit time T. The client device determines the ratio of the unit time T to the determined time interval, t2−t1, to determine $$\frac{T}{t2-t1},$$

which represents the network performance value that the client device will report to the server. As can be seen from $$\frac{T}{t2-t1},$$

a smaller time interval between the sent time for the information acquisition request sent by the client device and the receipt time for the information returned by the server indicates a better network environment with higher bandwidth rate for the client device.

In some embodiments, if either the time interval between the current time (e.g., as maintained by the client device) and the most recently recorded sent time and the time interval between the most recently recorded sent time and corresponding receipt time as determined by the client device exceeds a set threshold value (e.g., 10 minutes), then the client device can use a preset default network performance weight as the network performance weight to report to the server.

In some embodiments, the client device determines the network access mode information that it is currently using by and sends the network access mode information to the server. For example, if the client device were running the Android™ platform, then the network access mode can be determined by a platform-specific API call (e.g., a call made to the ConnectivityManager class NetworkInfo and to the getType ( )method). Examples of network access mode include 2nd generation (2G) mobile communication technology networks, 3rd generation (3G) mobile communication technology networks, long-term evolution networks (4G LTE), and wireless fidelity (Wi-Fi) networks. An information transmission speed, s, corresponding to each of 2G networks, 3G networks, long-term evolution networks (4G LTE), and Wi-Fi networks may be preset at the server. For example, if the network access mode were 2G network, then the corresponding information transmission speed s=0.5; if the network access mode were 3G network, then the corresponding information transmission speed s=1; and if the network access mode were a WiFi network, then the corresponding information transmission speed s=2. A greater information transmission speed corresponding to the network access mode information reported by the client device is related to a correspondingly larger quantity of information that should be sent back to the client device. Conversely, a lower information transmission speed corresponding to the network access mode information reported by the client is related to a correspondingly smaller quantity of information that should be sent back to the client device.

At 406, a reading speed corresponding to the user identifier is determined. In some embodiments, the reading speed corresponding to the user identifier is determined based at least in part on steps 304 through 308 of process 300 of FIG. 3.

At 408, a quantity of requested information to be sent to the client device is determined based at least in part on the reading speed corresponding to the user identifier, the network performance weight, and the network access mode information.

In some embodiments, the quantity of requested information to be sent to the client device can be determined as a function of the network performance weight and the information transmission speed corresponding to network access mode information received from the client device in addition to the reading speed corresponding to the user identifier associated with the information acquisition request. In some embodiments, a functional relationship, e.g., N=F(v, f, s), that relates the quantity of information (N) to be sent back to reading speed (v), network performance weight (f), and network access mode information (s), may be preset at the server. F(v, f, s) an be selected to be a continuous function or a discrete function. For example, N=F(v, f, s)=0.2*v*f*s.

At 410, the quantity of the requested information to be sent is transmitted to the client device.

Figure 5:
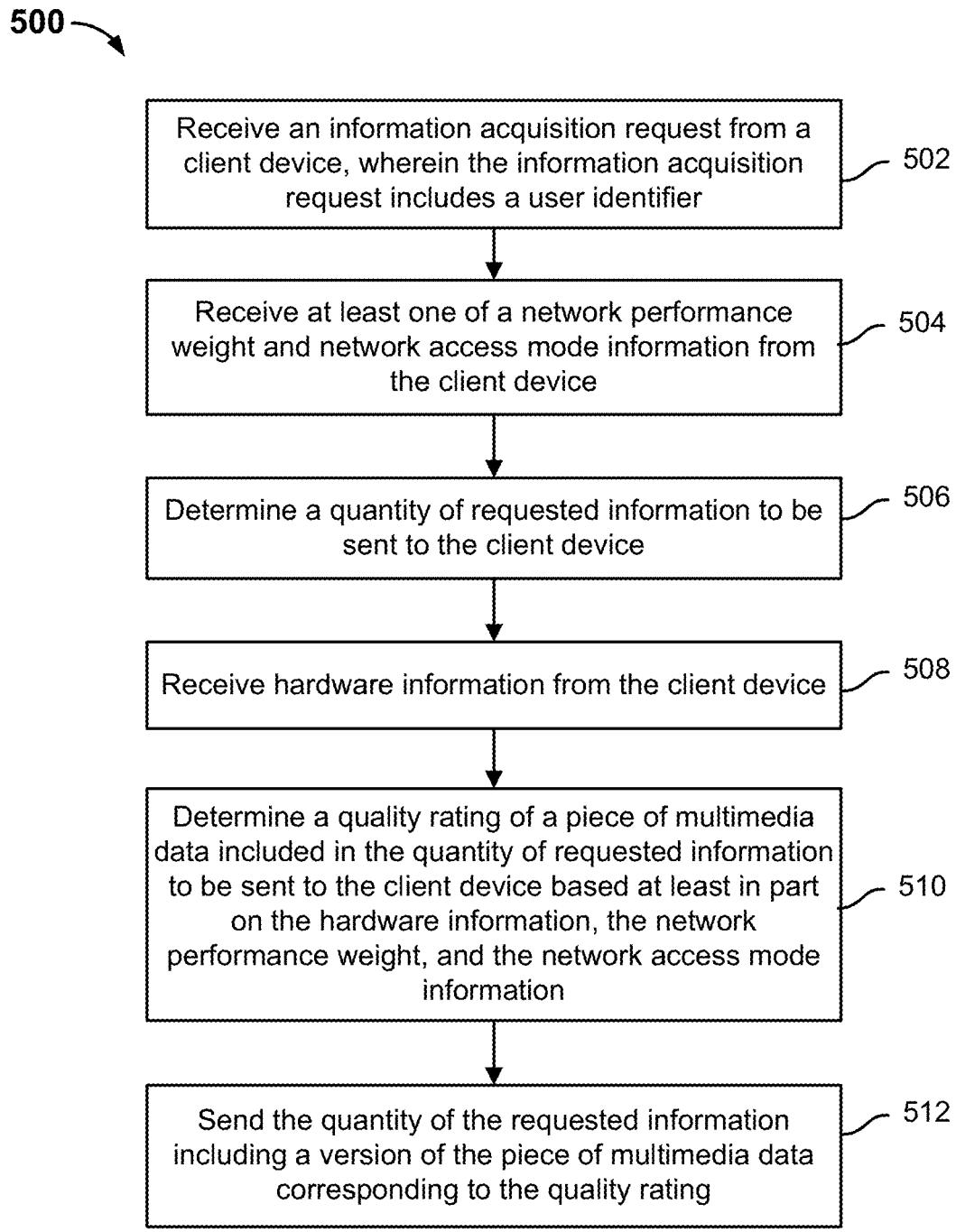
FIG. 5 is a flow diagram showing an embodiment of a process for transmitting information from a server to a client device.

FIG. 5 is a flow diagram showing an embodiment of a process for transmitting information from a server to a client device. In some embodiments, process 500 is implemented at system 200 of FIG. 2. Specifically, in some embodiments, process 500 is implemented at server 204 of system 200 of FIG. 2.

In some embodiments, the requested information comprises multimedia data such as graphics, audio, and video, for example. The ability of each client device to display multimedia data will vary depending on the hardware used associated with the client device. As such, in some embodiments, a quality rating of a piece of multimedia data included in the requested information to be sent to the client device is determined at least in part on a hardware performance weight associated with the client device. Process 500 describes an example process of determining a quality rating associated with the multimedia data that is included in the quantity of requested information to be sent to the client device.

At 502, an information acquisition request is received from a client device, wherein the information acquisition request includes a user identifier. Step 502 can be implemented in a way similar to how step 302 of process 300 of FIG. 3 is implemented.

At 504, at least one of a network performance weight and network access mode information is received from the client device. In some embodiments, the network performance weight can be determined by the client device in a similar manner to the manner described with step 404 of process 400 of FIG. 4.

At 506, a quantity of requested information to be sent to the client device is determined. In some embodiments, the quantity of requested information that is to be sent back to the client device can be determined based on steps 304 through 310 of process 300 of FIG. 3. In some embodiments, the quantity of requested information that is to be sent back to the client device can be determined based on steps 404 through 408 of process 400 of FIG. 4.

For example, the determined quantity can be 15 pieces of information and the requested information comprises messages within a particular page of a message board. As such, 15 messages from that particular page of the message board will be sent to the client device. Because no messages from this page of the message board have been previously sent to the client device, messages 1 through 15 of 100 messages associated with the page will be sent to the client device.

At 508, hardware information is received from the client device.

In some embodiments, before the server sends a determined quantity of requested information to the client device, the server also needs to receive the hardware information as reported by the client device.

To use multimedia data that is graphic data as an example, graphics that have higher resolutions may be better suited to be displayed at client devices whose screen pixel densities are relatively high. If the resolution of the graphics included in the requested information to send to the client device is too low relative to the screen pixel density of the client device, the graphics will appear pixelated at the client device and that will have a negative effect on the user experience. Conversely, a client device whose screen pixel density is relatively low is not suited to display graphics whose resolution is high. If the resolution of the graphics included in the requested information to send to the client device is too high, the high quality nature of the graphics may not be apparent in the display of the client device and result in wasted network resources due to the larger size of requested information.

Examples of parameters of hardware information as reported by the client device include but are not limited to client CPU model number, CPU frequency, total memory, available memory, free memory, screen resolution, and screen pixel density. For example, the client CPU model number and CPU frequency can be obtained by the client device parsing the CPUinfo file within the proc file system. For example, the total memory can be obtained by the client device parsing the meminfo file within the proc file system. For example, the available memory and free memory can be obtained by the client device making an API call using ActivityManager.MemoryInfo. For example, the screen resolution can be obtained by the client device making an API call using getWindowManager( ).GetDefaultDisplay( ). For example, the screen density can be obtained by the client device making an API call using DisplayMetrics and the property of "Density." After the server receives the hardware information as reported by the client, the server can determine the hardware performance weight corresponding to the client device based at least in part on the received parameter(s) of hardware information and a preset mapping of parameters of hardware information to preset hardware performance weights. For example, hardware performance weight, h=(CPU frequency)*(size of available memory). A higher hardware performance weight indicates that the client device's hardware performance is better and that the quality rating for the multimedia data to be sent to the client device should be higher. Conversely, a lower hardware performance weight indicates that the client device's hardware performance is worse and that the quality rating for the multimedia data to be sent to the client device should be lower.

In addition, if the network performance weight in which the client device is currently located is relatively poor or if the information transmission speed corresponding to the network access mode currently used by the client device is relatively low, then the server should send back lower-quality multimedia data to the client device.

At 510, a quality rating of a piece of multimedia data included in the quantity of requested information to be sent to the client device is determined based at least on in part the hardware information, the network performance weight, and the network access mode information.

In some embodiments, it is determined that the quantity of requested information to be sent to the client device includes at least one piece of multimedia data. In the event that the quantity of the requested information includes at least one piece of multimedia data, the server is further configured to determine a particular quality rating for the multimedia data that is to be included in the quantity of requested information to be sent to the client device. For example, a quality rating associated with a multimedia data is associated with a size and quality at which the data can be rendered/displayed/ played back at the client device. A version of a multimedia data associated with a higher quality rating can be rendered to be of a higher quality at the client device than a version of the same multimedia data associated with a lower quality rating. However, the version of the multimedia data associated with the higher quality rating has a larger file size than the version of the same multimedia data associated with the lower quality rating. The type of a quality rating may depend on the type of the multimedia data. For example, for graphics/images, the quality rating can pertain to a resolution; for audio, the quality rating can pertain to bitrate; and for video, the quality rating can pertain to sharpness or bitrate.

The server can determine a quality rating associated with at least one piece of multimedia data included in the requested information to be sent to the client device based at least in part on the received hardware information, network performance weight, and network access mode information as reported by the client device. The server will then send back to the client device the determined quantity of requested information including a version of the multimedia data corresponding to the determined quality rating.

In some embodiments, the higher the hardware performance weight that is determined by the server based on the hardware information that is reported by the client device, the higher the quality rating will be for the multimedia data to be included in the requested information to be sent to the client device. Conversely, the lower the determined hardware performance weight, the lower the quality rating will be for the multimedia data to be included in the requested information to be sent to the client device.

In some embodiments, the higher the network performance weight that is reported by the client device, the higher the quality rating will be for the multimedia data to be included in the requested information sent back from the server.

In some embodiments, the greater the transmission speed corresponding to the network access mode information that is reported by the client, the higher the quality rating will be for the multimedia data to be included in the requested information to be sent to the client device.

In some embodiments, a functional relationship, e.g., P=G(h, f, s), that relates the quality rating (P) to hardware performance weight (h), network performance weight (f), and network access mode information (s) may be preset at the server. G(h, f, s) can be selected to be an increasing function as it relates to h, f and s. G(h, f, s) can be selected to be either a continuous function or a discrete function. In some embodiments, function G(h, f, s) can yield one of various predetermined values of P. P=G(h, f, s)=20*h*f*s.

In some embodiments, after the quality rating of the multimedia data to be included in the requested information to send to the client device is determined, a version of the multimedia data associated with the determined quality rating is obtained. The following are two example techniques by which the version of the multimedia data associated with the determined quality rating can be obtained.

A) First technique: Prior to an implementation of process 500, the server can generate and store several versions of each piece of multimedia data, where each version corresponds to a different predetermined quality rating. After the quality rating of the multimedia data is determined using step 510, the server can look up a version of the multimedia data corresponding to the quality rating determined for the multimedia data from among the different stored versions of the multimedia data. For example, prior to an implementation of process 500, the server can pre-generate four versions corresponding to four different resolutions of a certain graph, graphic A. For example, the four versions of graphic A may correspond to the following four resolutions: 128 pixels per inch (ppi), 256 ppi, 512 ppi, and 1024 ppi. The four versions of graphic A can be labeled respectively as "A_128," "A_256," "A_512," and "A_1024" and stored. For example, each version of graphic A can be generated from an original version of graphic A, which is associated with the highest resolution. For example, if it is assumed that the quality rating for a graphic A that is to be included in requested information to be is 128 ppi (as determined by the server according to the user-reported hardware information, network performance weight, and network access mode information), the server can look up the graphic labeled "A_128" and include it among the requested information that is to be sent to the client device. In another example, assume that the determined quality rating for graphic A that is to be included in requested information to send to the client device is a resolution that does not match the quality rating of any pre-generated version of the piece of multimedia data. In this case where an exact match does not exist, a stored version of the piece of multimedia data with a quality rating that is closest to the determined quality rating is selected. As such, the first technique allows for the appropriate version of the piece of multimedia data corresponding to the determined quality rating to be efficiently obtained by simply selecting the appropriate pre-generated version of a piece of multimedia data from various pre-generated versions.

B) Second technique: Prior to an implementation of process 500, the server can store the original version of each piece of multimedia data. For example, the original version of a piece of multimedia data comprises the version of the piece of multimedia data corresponding to a high quality rating. After the quality rating of the multimedia data is determined using step 510, the server can dynamically generate a version of the piece of multimedia data that corresponds to the determined quality rating. For example, the server can generate a version of the piece of multimedia data that corresponds to the determined quality rating from the original version of the piece of multimedia data (assuming that the determined quality rating is lower than the quality rating of the original version of the piece of multimedia data). As such, the second technique does not require storage space to be used for storing multiple versions of each piece of multimedia data because the appropriate version of the piece of multimedia data corresponding to the determined quality rating can be dynamically generated as needed.

The two techniques described above for obtaining the appropriate version of the piece of multimedia data corresponding to the determined quality rating may be implemented according to actual application scenarios. In some embodiments, the two techniques may be used in combination. For example, when certain pieces of multimedia data are acquired more frequently (e.g., the number of acquisitions within a set length of time exceeds a designated threshold value), different versions of each of those pieces of multimedia data may be pre-saved (i.e., using the first technique described above). When certain pieces of multimedia data are acquired less frequently (e.g., the number of acquisitions within a set length of time does not exceed a designated threshold value), then only the original version of multimedia data is saved (i.e., using the second technique described above).

At 512, the quantity of the requested information including a version of the piece of multimedia data corresponding to the quality rating is sent to the client device.

Returning to the earlier example, the determined quantity of requested information includes messages 1 through 15 of 100 messages associated with particular page of a message board. It is determined that at least message 3 includes an image, image ABC. Applying steps 506 through 510, the resolution of 128 ppi for image ABC is determined. Therefore, for a message among messages 1 through 15 that includes the image ABC, the 128 ppi version of image ABC is sent from the server to the client device.

Process 300 of FIG. 3, process 400 of FIG. 4, and process 500 of FIG. 5 describe embodiments in which the server implementing the service stores the logic for determining the appropriate quantity of requested information to be sent to a client device and/or determining the appropriate quality rating of a piece of multimedia data to be included in the quantity of requested information to be sent to the client device. As such, if the logic associated with determining such quantities and/or quality ratings change, then the changes need only be made centrally at the server.

In some embodiments, the client device can store at least some of the logic for determining the appropriate quantity of requested information to be sent to a client device and/or determining the appropriate quality rating of a multimedia data to be included in the quantity of requested information to be sent to the client device. Process 600 describes an example of a process in which the client device makes at least some of such determinations.

Figure 6:
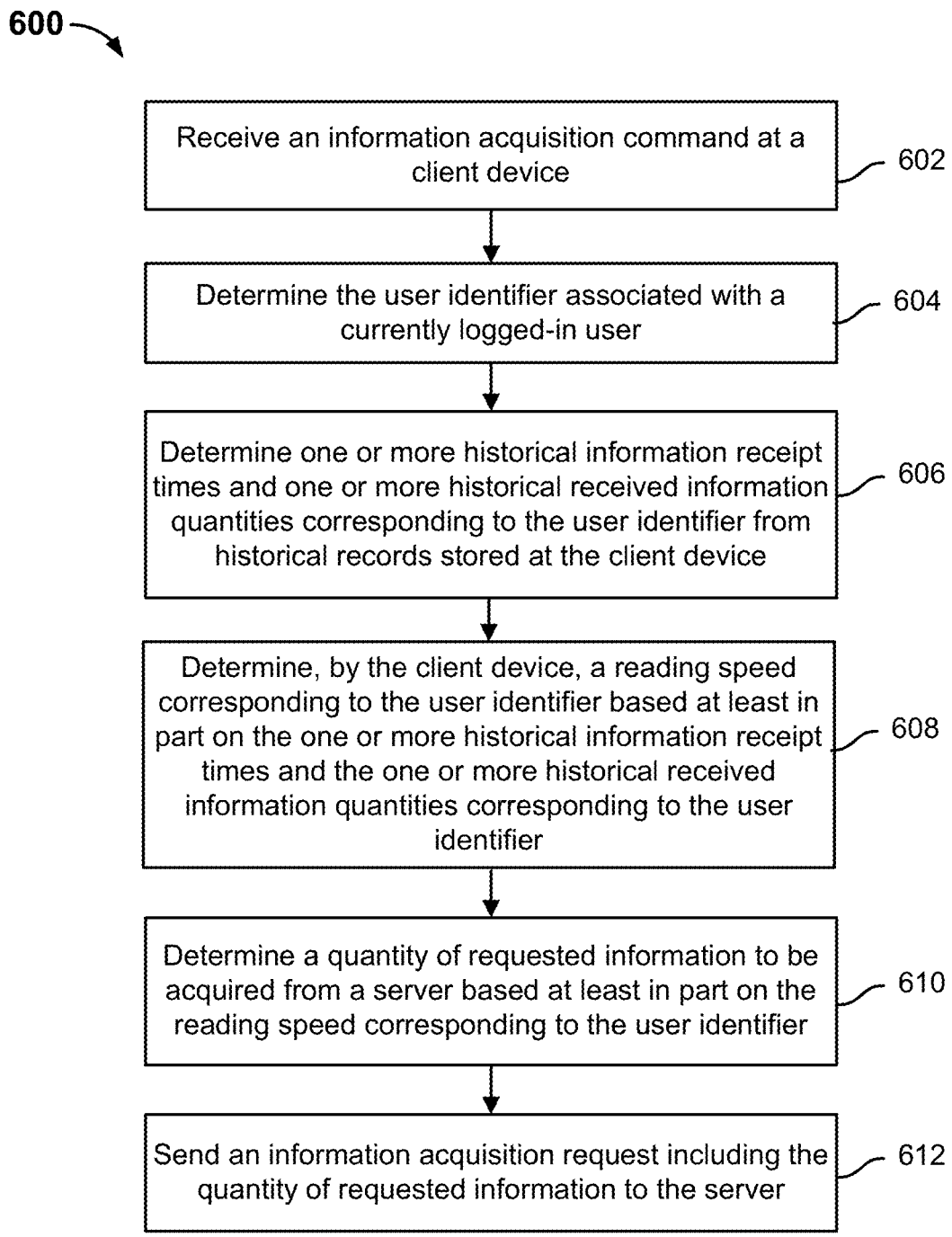
FIG. 6 is a flow diagram showing an embodiment of a process for requesting information by a client device.

FIG. 6 is a flow diagram showing an embodiment of a process for requesting information by a client device. In some embodiments, process 600 is implemented at system 200 of FIG. 2. Specifically, in some embodiments, process 600 is implemented at client device 202 of system 200 of FIG. 2.

Process 600 describes an embodiment in which the client device stores historical records including historical information receipt times and historical received information quantities corresponding to each user identifier. Process 600 also describes an embodiment in which the client device determines the reading speed corresponding to the user identifier. In some embodiments, process 600 can be implemented when it is desirable to reduce the computational workload at the server implementing the service.

At 602, an information acquisition command is received at the client device. For example, the information acquisition command is generated in response to a user selection (e.g., a user selection of a "Load More" button or a "Next Page" button) at a software application. In some embodiments, the information acquisition command is associated with data identifying which information is requested.

At 604, a user identifier associated with a currently logged-in user is determined. The client device can determine the user identifier of the user who is currently logged into an executing application associated with a service.

At 606, one or more historical information receipt times and one or more historical received information quantities corresponding to the user identifier are determined from historical records stored at the client device.

Process 300 of FIG. 3 describes that the server implementing the service stores historical records regarding the historical information sent times and historical received information quantities. In process 600, the client device can maintain similar records. In process 600, the client device can store historical data for a user identifier corresponding to a user who has logged into the application at the client device each time that requested information is received at the client device. The stored data includes the time at which requested information (i.e., the information receipt time) was received from the server and the quantity of the transmission of information that was received at that information receipt time (i.e., the received information quantity).

At 608, a reading speed corresponding to the user identifier is determined by the client device based at least in part on the one or more historical information receipt times and the one or more stored historical received information quantities.

The looked up historical information sent times and historical sent information quantities are used to determine the reading speed corresponding to the user identifier. In some embodiments, step 608 can be implemented in a manner similar to step 308 of process 300 of FIG. 3, except where the determination is performed at the client device instead of the server and "historical information receipt times" can be substituted for "historical information sent times" of step 308 and "historical received information quantities" can be substituted for "historical sent information quantities" of step 308.

At 610, a quantity of requested information to be acquired from a server is determined based at least in part on the reading speed corresponding to the user identifier.

The client device can determine what quantity of desired information is to be requested from the server. In some embodiments, the quantity of requested information to be acquired from the server is determined using the reading speed corresponding to the user identifier. In such embodiments, step 610 can be implemented in a manner similar to step 310 of process 300 of FIG. 3, where the determination is performed at the client device.

In some embodiments, the quantity of requested information to be acquired from the server is determined using the network performance weight and network access mode information in addition to the reading speed corresponding to the user identifier. For example, the network performance weight and network access mode information can be determined at the client device. In such embodiments, step 610 can be implemented in a manner similar to step 408 of process 400 of FIG. 4, except where the determination is performed at the client device instead of the server.

At 612, an information acquisition request including the quantity of the requested information is sent to the server. The server can determine the quantity of the requested information from the request and send such information to the client device.

In some embodiments, the information acquisition request also includes data identifying which type of data is requested from the server. In some embodiments, before the client device sends the information acquisition request, the client device additionally determines a quality rating corresponding to a piece of multimedia data that may be included in the quantity of the requested information. In some embodiments, the quality rating corresponding to a piece of multimedia data that may be included in the quantity of the requested information is determined using hardware information associated with the client device, the network performance weight, and network access mode information. In such embodiments, the quality rating can be determined in a manner similar to step 510 of process 500 of FIG. 5, except where the determination is performed at the client device instead of the server. Then, the determined quality rating corresponding to a piece of multimedia data is also included in the information acquisition request in addition to the determined quantity.

After the server determines the quantity of the requested information (and in some embodiments, the determined quality rating corresponding to a piece of multimedia data) from the request, the server can send to the client device the quantity of the requested information (and in some embodiments, the requested information includes at least one piece of multimedia data corresponding to the quality rating).

Figure 7:
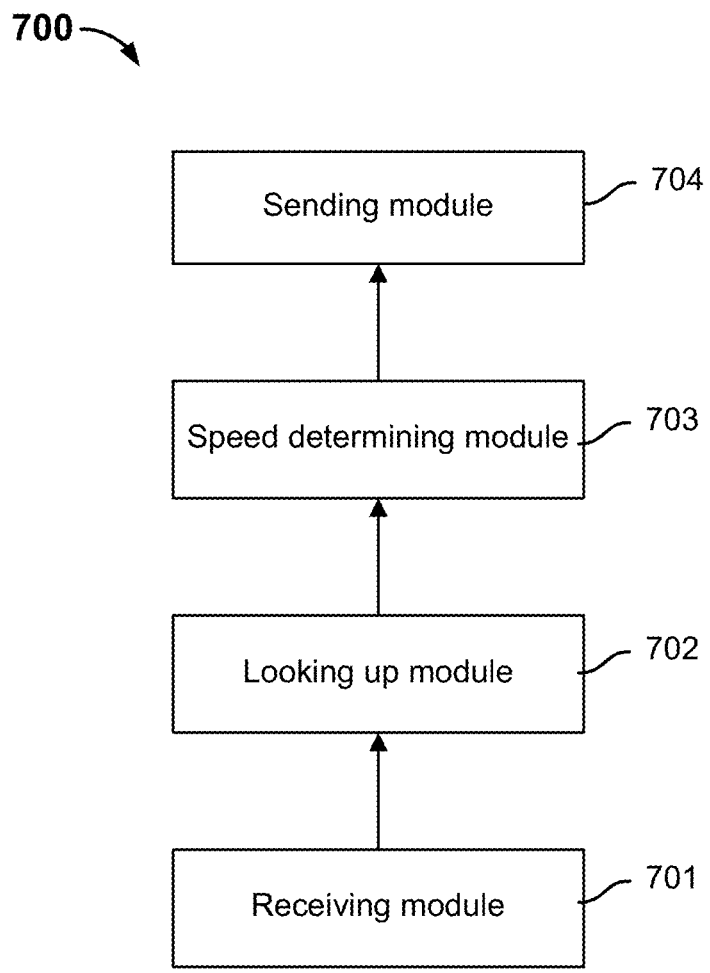
FIG. 7 is a diagram showing an embodiment of a server implementing a server.

FIG. 7 is a diagram showing an embodiment of a server implementing a service. In the example, system 700 includes sending module 704, speed determining module 703, looking up module 702, and receiving module 701.

The modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Receiving module 701 is configured to receive an information acquisition request from a client device, where the information acquisition request includes a user identifier. In some embodiments, receiving module 701 is further configured to receive at least one of the network performance weight and the network access mode information as reported by the client device. In some embodiments, receiving module 701 is configured to receive hardware information from the client device.

Looking up module 702 is configured to determine the user identifier included in the information acquisition request. Looking up module 702 is also configured to determine one or more historical information sent times and one or more historical sent information quantities corresponding to the user identifier from stored historical records. In some embodiments, looking up module 702 is configured to look up historical information sent times and corresponding historical sent information quantities corresponding to the user identifier within the most recent preset designated time length.

Speed determining module 703 is configured to determine a reading speed corresponding to the user identifier based at least in part on the one or more historical information sent times and one or more historical sent information quantities corresponding to the user identifier. For example, the reading speed can be determined as a ratio of the sum of all sent information quantities to the time interval between the earliest information sent time and the most recent information sent time. In some embodiments, the reading speed is determined based at least in part on historical information sent times and corresponding historical sent information quantities corresponding to the user identifier within the most recent preset designated time length. For example, the reading speed can be determined as a ratio of the sum of the sent information quantities within the most recent preset designated time length to the designated time length.

Sending module 704 is configured to determine a quantity of requested information to be sent to the client device based at least in part on the reading speed corresponding to the user identifier. In some embodiments, the greater the reading speed, the greater the quantity of requested information is determined to be sent to the client device. In some embodiments, sending module 704 is configured to use the received network access mode information to determine a corresponding information transmission speed. Then, sending module 704 is configured to use the received network performance weight and corresponding information transmission speed in addition to the reading speed to determine a quantity of requested information to be sent to the client device. For example, the greater the network performance weight is, the greater the determined quantity of requested information will be and the greater the information transmission speed is, the greater the determined quantity of requested information will be. In some embodiments, sending module 704 is configured to determine a quality of a piece of multimedia data included in the determined quantity of requested information to be sent back to the client device based at least in part on the hardware information, the network performance weight, and the network access mode information as reported by the client device. In some embodiments, sending module 704 is configured to use the received hardware information to determine a corresponding hardware performance weight. For example, the higher hardware performance weight is, the better the quality rating for the multimedia data will be.

Figure 8:
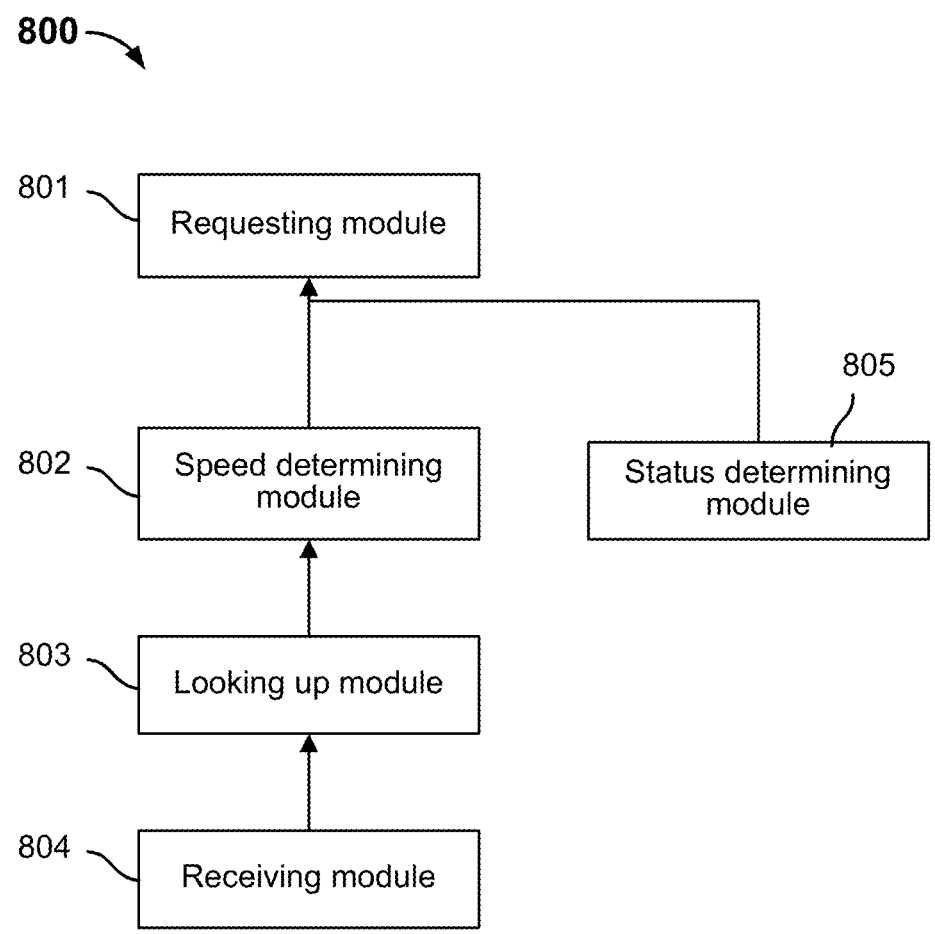
FIG. 8 is a diagram showing an embodiment of a client device executing an application associated with a server.

FIG. 8 is a diagram showing an embodiment of a client device executing an application associated with a server. In the example, system 800 includes requesting module 801, speed determining module 802, looking up module 803, receiving module 804, and status determining module 805.

Receiving module 804 is configured to receive an information acquisition command. For example, receiving module 804 receives an information acquisition command in response to a user selection at the application associated with the server.

Looking up module 803 is configured to determine the user identifier associated with a currently logged-in user. Looking up module 803 is further configured to determine one or more historical information receipt times and one or more historical received information quantities corresponding to the user identifier from historical records stored at the client device. In some embodiments, looking up module 803 is configured to look up historical information receipt times and corresponding historical sent information quantities corresponding to the user identifier within the most recent preset designated time length.

Speed determining module 802 is configured to determine a reading speed corresponding to the user identifier based at least in part on the one or more historical information receipt times and one or more historical received information quantities corresponding to the user identifier. For example, the reading speed can be determined as a ratio of the sum of all received information quantities to the time interval between the earliest information receipt time and the most recent information receipt time. In some embodiments, the reading speed is determined based at least in part on historical information receipt times and corresponding historical received information quantities corresponding to the user identifier within the most recent preset designated time length. For example, the reading speed can be determined as a ratio of the sum of the received information quantities within the most recent preset designated time length to the designated time length.

Requesting module 801 is configured to determine a quantity of requested information to be acquired from a server based at least in part on the reading speed corresponding to the user identifier. In some embodiments, the greater the reading speed, the greater the quantity of requested information is determined to be acquired from the server. Requesting module 801 is configured to send an information acquisition request including the determined quantity of requested information to the server. In some embodiments, requesting module 801 is configured to use the network access mode information determined by status determining module 805 to determine a corresponding information transmission speed. Then, requesting module 801 is configured to use the network performance weight determined by status determining module 805 and corresponding information transmission speed in addition to the reading speed to determine a quantity of requested information to be acquired from the server. For example, the greater the network performance weight is, the greater the determined quantity of requested information will be and the greater the information transmission speed is, the greater the determined quantity of requested information will be. In some embodiments, requesting module 801 is configured to determine a quality of a piece of multimedia data included in the determined quantity of requested information to be acquired from the server based at least in part on the hardware information, the network performance weight, and the network access mode information as determined by status determining module 805.

Status determining module 805 is configured to determine, prior to requesting module 801 determining the quantity of the requested information to be acquired from the server, at least one of the client device's network performance weight and network access mode information. In some embodiments, status determining module 805 is further configured to determine the client device's hardware information.

Through the techniques described above, a server can send back an appropriate quantity of information according to the reading speed of each user. As a result of tailoring the amount of information to send to a client device to based on individualized needs of that device's user, the server will likely receive and process fewer information acquisition requests, which can reduce the workload on the server implementing the service.

Figure 9:
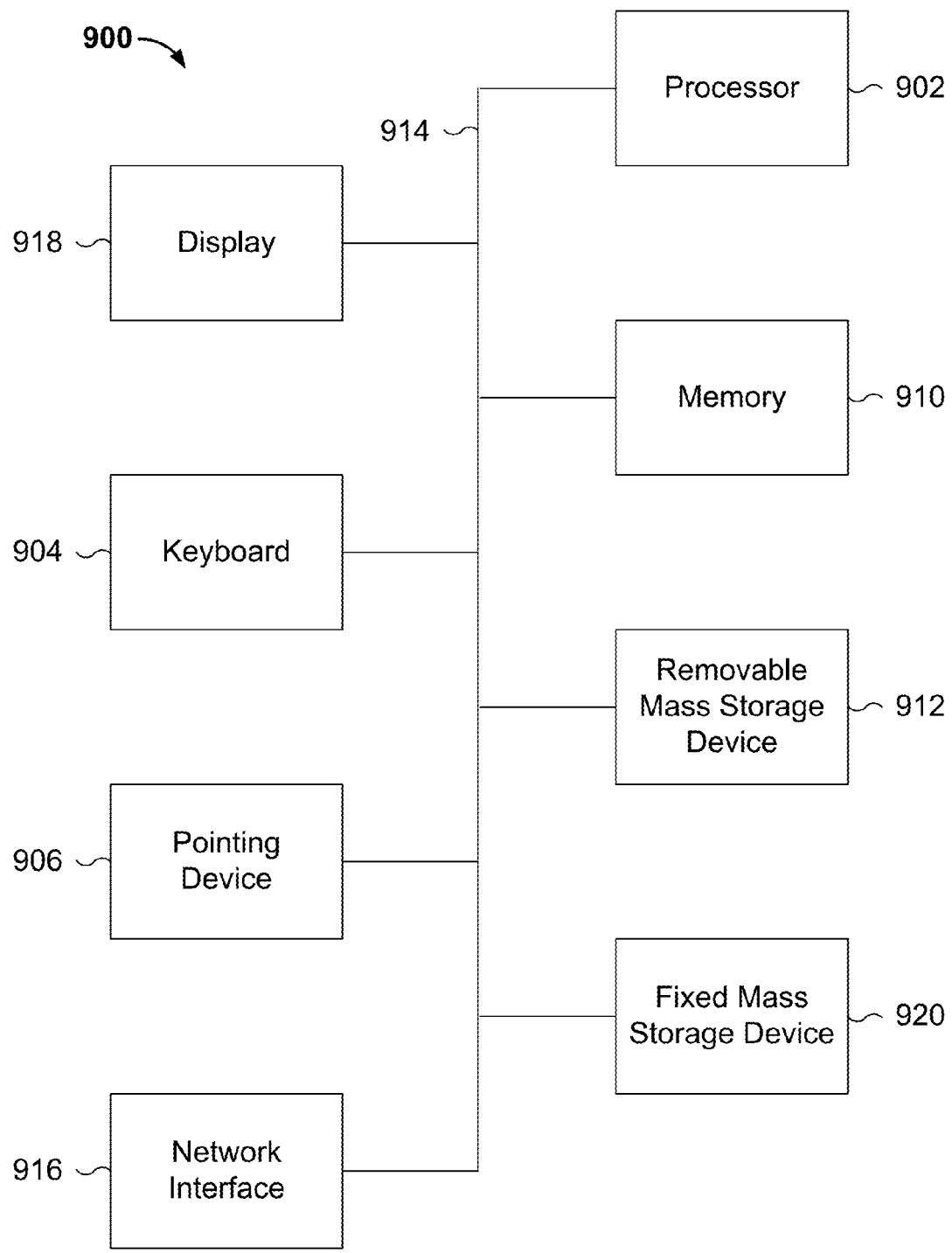
FIG. 9 is a functional diagram illustrating an embodiment of a programmed computer system for implementing a service for transmitting information based on reading speed.

FIG. 9 is a functional diagram illustrating an embodiment of a programmed computer system for implementing a service for transmitting information based on reading speed. As will be apparent, other computer system architectures and configurations can be used to transmit information based on reading speed. Computer system 900, which includes various subsystems as described below, includes at least one microprocessor subsystem (also referred to as a processor or a central processing unit (CPU) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used to provide transmission of information based on reading speed.

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 102 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storage 912, 920 generally store additional programming instructions, data, and the like that typically are not in active use by the processor 902. It will be appreciated that the information retained within mass storage 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 102 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer readable medium is any data storage device that can store data which can thereafter be read by a computer system. Examples of non-transitory computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

A person skilled in the art should understand that the embodiment of the present application can be provided as methods, systems or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, equipment (systems) and computer program products. Please note that each flow chart and/or block diagram within the flowcharts and/or block diagrams and combinations of flow charts and/or block diagrams within the flowcharts and/or block diagrams can be realized by computer commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on specially-operating computer-readable storage devices that can guide computers or other programmable data processing equipment, with the result that the commands stored on these computer-readable devices give rise to commodities that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A server, comprising:
one or more processors configured to:
receive an information acquisition request from a client device, wherein the information acquisition request includes a user identifier, wherein the user identifier is associated with a currently logged-in user;
determine the user identifier included in the information acquisition request;
determine one or more historical information sent times and one or more historical sent information quantities corresponding to the user identifier from stored historical records;
determine a reading speed corresponding to the user identifier based at least in part on the one or more historical information sent times and the one or more historical sent information quantities corresponding to the user identifier;
determine that a piece of multimedia data is to be included in information requested by the information acquisition request;
receive at least one of hardware information, a network performance weight, and network access mode information from the client device;
determine a quality rating associated with the piece of multimedia data based at least in part on at least one of the hardware information, the network performance weight, and the network access mode information;
dynamically generate a version of the piece of multimedia data corresponding to the determined quality rating from an original version of the piece of multimedia data;
determine a quantity of requested information to be sent to the client device based at least in part on the reading speed corresponding to the user identifier, the network performance weight, and the network access mode information; and
send the requested information to the client device, wherein the requested information includes the dynamically generated version of the piece of multimedia data; and
one or more memories coupled to the one or more hardware processors and configured to provide instructions to the one or more hardware processors.

2. The server of claim 1, wherein to determine the reading speed corresponding to the user identifier, the one or more hardware processors are configured to:
identify among the stored historical records a most recent information sent time corresponding to the user identifier as T1 and an earliest information sent time corresponding to the user identifier as T2;
determine sum m of the one or more historical sent information quantities corresponding to the user identifier among the stored historical records; and
determine $$\frac{m}{T1-T2}$$

as the reading speed corresponding to the user identifier.

3. The server of claim 1, wherein to determine the reading speed corresponding to the user identifier, the one or more hardware processors are configured to:
identify among the stored historical records historical information sent time(s) corresponding to the user identifier within a most recent preset designated time length;
determine a sum of historical sent information quantities corresponding to the historical information sent time(s) within the most recent preset designated time length; and
determine a ratio of the sum to the preset designated time length as the reading speed corresponding to the user identifier.

4. The server of claim 1, wherein quantity of requested information is determined to be a monotonically increasing function of the reading speed.

5. The server of claim 1, wherein the quantity of requested information is determined to be a monotonically increasing function of the network performance weight.

6. The server of claim 1, wherein the quantity of requested information is determined to be a monotonically increasing function of a transmission speed corresponding to the network access mode information.

7. The server of claim 1, wherein the quality rating corresponding to the piece of multimedia data is determined to be a monotonically increasing function of the hardware information.

8. A method, comprising:
receiving an information acquisition request from a client device, wherein the information acquisition request includes a user identifier, wherein the user identifier is associated with a currently logged-in user;
determining the user identifier included in the information acquisition request;
determining one or more historical information sent times and one or more historical sent information quantities corresponding to the user identifier from stored historical records;
determining, using one or more hardware processors, a reading speed corresponding to the user identifier based at least in part on the one or more historical information sent times and the one or more historical sent information quantities corresponding to the user identifier;
determining that a piece of multimedia data is to be included in information requested by the information acquisition request;
receiving at least one of hardware information, a network performance weight, and network access mode information from the client device;
determining a quality rating associated with the piece of multimedia data based at least in part on at least one of the hardware information, the network performance weight, and the network access mode information;
dynamically generating a version of the piece of multimedia data corresponding to the determined quality rating from an original version of the piece of multimedia data;
determining a quantity of requested information to be sent to the client device based at least in part on the reading speed corresponding to the user identifier, the network performance weight, and the network access mode information; and sending the requested information to the client device, wherein the requested information includes the dynamically generated version of the piece of multimedia data.

9. The method of claim 8, wherein determining the reading speed corresponding to the user identifier comprises:
identifying among the stored historical records a most recent information sent time corresponding to the user identifier as T1 and an earliest information sent time corresponding to the user identifier as T2;
determining sum m of the one or more historical sent information quantities corresponding to the user identifier among the stored historical records; and
determining $$\frac{m}{T1-T2}$$

as the reading speed corresponding to the user identifier.

10. The method of claim 8, wherein determining the reading speed corresponding to the user identifier comprises:
identifying among the stored historical records historical information sent time(s) corresponding to the user identifier within a most recent preset designated time length;
determining a sum of historical sent information quantities corresponding to the historical information sent time(s) within the most recent preset designated time length; and
determining a ratio of the sum to the preset designated time length as the reading speed corresponding to the user identifier.

11. The method of claim 8, wherein the quantity of requested information is determined to be a monotonically increasing function of the reading speed.

12. The method of claim 8, wherein the quantity of requested information is determined to be a monotonically increasing function of the network performance weight.

13. The method of claim 8, wherein the quantity of requested information is determined to be a monotonically increasing function of a transmission speed corresponding to the network access mode information.

14. The method of claim 8, wherein the quality rating corresponding to the piece of multimedia data is determined to be a monotonically increasing function of the hardware information.

15. A client device, comprising:
one or more hardware processors configured to:
receive an information acquisition command;
determine a user identifier associated with a currently logged-in user;
determine one or more historical information receipt times and one or more historical received information quantities corresponding to the user identifier from stored historical records;
determine a reading speed corresponding to the user identifier base at least in part on the one or more historical information receipt times and the one or more historical received information quantities correspond to the user identifier;
determine that a piece of multimedia data is to be included in information that is requested by the information acquisition command;
determine a quality rating associated with the piece of multimedia data based at least in part on at least one of a hardware information, a network performance weight, and a network access mode information associated with the client device;
determine a quantity of requested information to be acquired from a server based at least in part on the reading speed corresponding to the user identifier, the network performance weight, and the network access mode information;
send an information acquisition request including the quantity of requested information and the quality rating associated with the piece of multimedia data to the server; and
receive, from the server, the requested information including a dynamically generated version of the piece of multimedia data corresponding to the quality rating that is dynamically generated corresponding to the quality rating from an original version of the piece of multimedia data; and
one or more memories coupled to the one or more hardware processors and configured to provide instructions to the one or more hardware processors.

16. A method, comprising:
receiving an information acquisition command;
determining a user identifier associated with a currently logged-in user;
determining one or more historical information receipt times and one or more historical received information quantities corresponding to the user identifier from stored historical records;
determining a reading speed corresponding to the user identifier based at least in part on the one or more historical information receipt times and the one or more historical received information quantities corresponding to the user identifier;
determining that a piece of multimedia data is to be included in information that is requested by the information acquisition command;
determining a reading speed corresponding to the user identifier based at least in part on at least one of a hardware information, a network performance weight, and a network access mode information associated with a client device;
determining a quantity of requested information to be acquired from a server based at least in part on the reading speed corresponding to the user identifier, the network performance weight, and the network access mode information;
sending an information acquisition request including the quantity of requested information and the quality rating associated with the piece of multimedia data to the server; and
receiving, from the server, the requested information including a dynamically generated version of the piece of multimedia data corresponding to the quality rating that is dynamically generated corresponding to the quality rating from an original version of the piece of multimedia data.

* * * * *